United States Patent [19]

Shannon et al.

[11] 4,280,338
[45] Jul. 28, 1981

[54] ROTATABLE FLEXIBLE DRIVE SHAFT WITH NOISE ABATEMENT

[75] Inventors: Gilbert E. Shannon, Lapeer; David F. Friesorger, Flint, both of Mich.

[73] Assignee: General Motors Corporation, Detroit, Mich.

[21] Appl. No.: 98,552

[22] Filed: Nov. 29, 1979

[51] Int. Cl.³ ............................................. F16C 1/02
[52] U.S. Cl. ..................................... 64/2 R; 64/4; 64/30 LB; 74/12
[58] Field of Search ............ 64/2 R, 1 S, 3, 4, 30 LB; 74/12

[56] References Cited

U.S. PATENT DOCUMENTS

| | | | |
|---|---|---|---|
| 1,228,439 | 6/1917 | Hotchkiss | 64/2 R |
| 1,329,717 | 2/1920 | Lloyd | 184/31 |
| 1,652,642 | 12/1927 | Shaw | 184/7 |
| 1,678,335 | 7/1928 | Gaston | 64/2 R |
| 1,773,902 | 8/1930 | Kesling | 64/2 R |
| 2,625,885 | 1/1953 | Mumma | 418/105 |
| 3,240,082 | 3/1966 | Bratz | 64/2 R |
| 3,440,836 | 4/1969 | Peterson | 64/4 |
| 4,112,708 | 9/1978 | Fukuda | 64/2 R |
| 4,126,928 | 11/1978 | Hoff | 64/2 R |
| 4,226,021 | 10/1980 | Hoff | 64/2 R |

*Primary Examiner*—Ira S. Lazarus
*Attorney, Agent, or Firm*—Charles R. White

[57] ABSTRACT

Flexible drive shaft, lubricated by a suitable grease, rotatably mounted within a flexible casing routed within a vehicle from an input to an output tip connected to a deflection instrument. The drive shaft and output tip are designed to pump the grease to a collection station so that collected grease serves as a cushion to limit contact of the drive shaft with the interior casing to thereby provide noise abatement for the rotating drive shaft.

3 Claims, 3 Drawing Figures

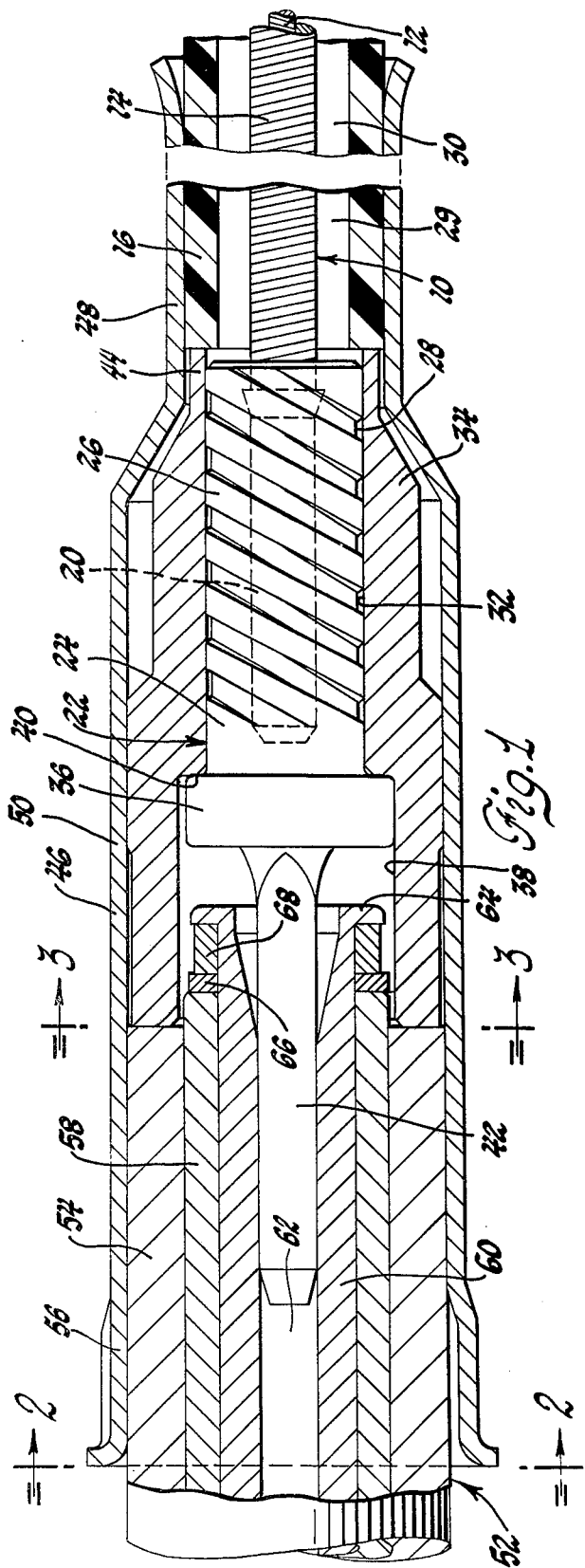
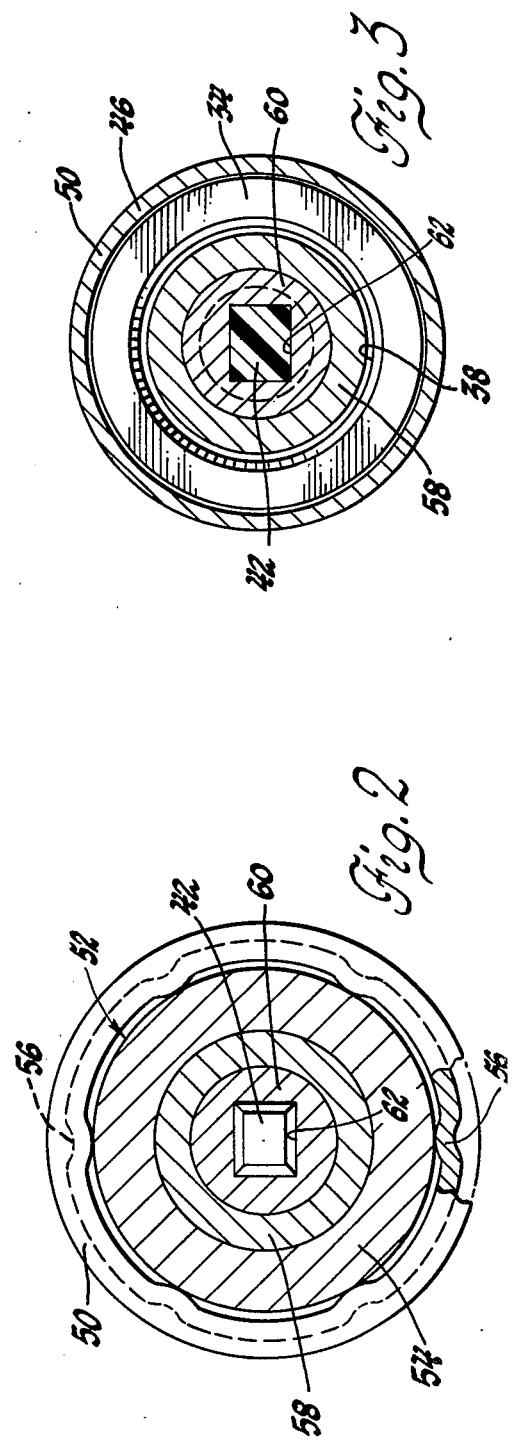

ROTATABLE FLEXIBLE DRIVE SHAFT WITH NOISE ABATEMENT

This invention relates to a flexible drive shaft rotatably mounted within a casing and more particularly to a new and improved flexible drive shaft which pumps lubricant into a collector station within the casing which cushions contact of the shaft with the casing to minimize shaft generated noises.

Prior to the present invention, flexible shafts for driving speedometer, tachometers and other deflection instruments have been rotatably mounted within an extruded plastic tubular casing maintained in a prescribed routing position within a vehicle. Such shafts normally have their outer wires wound in a left-hand screw direction lay and are lubricated with a non-polar oil grease disposed within the casing between the shaft and the casing. With this shaft and casing assembly, objectionable drive shaft noises may occur. Generally, such noises are caused by drive shaft on contact or "slap" with the casing at the instrument end of the drive shaft at resonant speeds.

This invention reduces the noise produced by such "drive shaft slap" by having the outer wire layer of the drive shaft wound in a right-hand screw direction lay. This drive shaft is lubricated with sufficient quantities of a selected grease such as a polar grease so that the drive shaft when being turned in a right-hand direction will pump the grease to a collection station at the output end of the cable. With quantities of the grease being retained in this station, a grease cushion will be provided to inhibit contact of the drive shaft with the casing to sharply reduce or eliminate noises generated by "drive shaft slap".

A feature, object and advantage of this invention is to provide a new and improved flexible drive shaft, rotatably mounted within a tubular casing, having a helical outer layer of wires wound in a predetermined direction lay so that the drive of a deflection instrument by the drive shaft will pump lubricating grease toward the instrument and to a collection station so that the grease contained therein will dampen and cushion contact of the drive shaft with the casing.

Another feature, object and advantage of this invention is to provide a new and improved flexible drive shaft rotatably mounted within an outer casing and feature "drive shaft slap" noise abatement in which the drive shaft is formed to pump limited quantities of the grease to a station adjacent the deflection instrument to serve as a cushion for dampening contact between the drive shaft and the casing.

Another feature, object and advantage of this invention is to provide a new and improved output tip for a drive shaft having grease return grooves formed therein to pump lubricating grease away from a deflection instrument so that the grease is collected within a predetermined station in the casing for the drive shaft for cushioning the contact of the drive shaft with the interior of the casing for reducing noises normally produced by such contact.

These and other features, objects and advantages of this invention will be more apparent from the following detailed description and drawing in which:

FIG. 1 is a longitudinal view primarily in section of one end of a flexible cable and a connection thereto to a deflection instrument such as a speedometer.

FIG. 2 is a cross sectional view taken along lines 2—2 of FIG. 1 as viewed in the direction of the indicator arrows; and FIG. 3 is a cross sectional view taken along lines 3—3 of FIG. 1.

Turning now in greater detail to the drawings, there is shown in FIG. 1 a flexible drive shaft 10 comprising a metallic core wire 12 around which is helically wound a wire outer layer 14. The turns of the outer layer 14 are serially engaged in flank contact and have a right-hand lead. Drive shaft 10, mounted in a flexible plastic tubular casing 16, is adapted to be rotatably driven by a drive gear operatively connected to the vehicle transmission output shaft not shown. The drive shaft 10 and casing 16 are routed within the vehicle from the drive gear to a speedometer or other deflection instrument not shown. The drive shaft 10 has an elongated and squared driving end 20 which is inserted into a corresponding squared opening centrally provided in a rotatable nylon output tip 22 which has a body portion 24 formed with helical threads 26 with a left-hand lead to provide a left-hand lead helical lubricant pumping groove 28. The pumping grooves 28 opens into a grease collection station 29 formed at the outer end of clearance 30 between the outer layer 14 of the drive shaft and the inner wall of the casing 16. This groove pumps lubricating grease into this station as will be subsequently described.

The output tip is rotatably mounted in a centralized bore 32 of a stepped-diameter cylindrical retainer bearing 34. The output trip has a cylindrical skirt 36 intermediate the ends thereof disposed in a counter bore 38 formed in bearing 34 which sealingly contacts the radial shoulder 40 formed by the bottom of the counter bore to block the passage of the lubricating grease outwardly from the skirt. In addition to the main body and skirt 36, the output tip 22 includes an elongated driving bit 42 rectilinear in cross section which extends axially from the skirt 36. This driving bit extends past the outer limit of bearing 34 to provide a rotatable output for the flexible drive shaft 10.

The retainer bearing 34 has an annular inner end 44 engaging the annular outer end of casing 16 to block the flow of lubricating grease from space 30 outwardly of and around the retainer bearing 34. Completing the output end of this flexible drive shaft and casing assembly is a quick connect ferrule 46 having a reduced diameter neck portion 48 in which the outer end of casing 16 is closely fitted. The reduced diameter neck portion is suitably crimped to insure the retention of the casing within the reduced diameter neck portion. The ferrule further has a large diameter main body 50 which engages and retains the bearing 34 and which extends beyond the outer limit thereof for connection with the neck end 52 of a speedometer or other deflection instrument.

The end portion 52 of the speedometer has a cylindrical casing 54 slidably fitted within the main body 50 of the ferrule and centralized therein by insets as at 56. An inner tubular bushing 58 is mounted in casing 54 which supports a rotatably tubular input shaft 60. The shaft 60 has a square socket 62 which fits the driving bit 42 of the output tip so that the input shaft 60 can be driven by drive shaft 10 through the intermediary provided by the output tip. Speedometer input shaft 60 has an enlarged head portion 64 at the input end thereof. Bearing 66 and spacer 68 mounted on shaft 60 are disposed between the head portion 64 and the end of the bushing 58 to receive thrust loads imparted thereto from the drive shaft 10.

With this invention lubricating grease such as a polar synthetic oil grease is injected into the cylindrical space 30 between the outer layer 14 of the drive shaft 10 and the casing 16. Such grease has additives which protect the inner wall of the casing and inhibit the lubricant from being absorbed into the plastic casing 16. The output gear driven by the transmission output shaft will rotate the drive shaft 10 in a clockwise direction so that the outer wires of the drive shaft wound in a right-hand screw direction lay will pump the grease toward the end of the drive shaft and to the collection station 29 at the outer end of the drive shaft. Any grease finding its way into the output tip 22 will be pumped back toward this collector station by the left-hand lead pumping grooves 28. With the lubricating grease being pumped to the outer end of the drive shaft and in the collection station between the drive shaft and the casing, a yieldable body of lubricant will be contained that serves to eliminate or reduce "drive shaft slap" by cushioning and retarding contact of the drive shaft with the interior of the casing at the instrument end thereof. This provides for abatement of drive shaft noises normally resulting from such contact frequently occurrring at resonant drive shaft speeds. To insure the distribution of the lubricating grease all along the flexible drive shaft, the internal diameter of the casing is increased to an extent where the grease pumping efficiency of the drive shaft is relatively low. This prevents the grease from being evacuated from the input end of the drive shaft to the collector station.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A drive for vehicle instrumentation having a rotatable input comprising a flexible and rotatable drive shaft, said drive shaft having outer wire means helically wound with a predetermined lead, a rotatable connector member secured to an end portion of said drive shaft to provide a drive connection to said input of the instrumentation, a flexible casing for said drive shaft extending generally coaxially therewith, said drive shaft being spaced radially inwardly from the inner walls of said casing to provide a lubricant receiving space therebetween, a quantity of lubricating grease disposed within said lubricant space, said drive shaft being adapted to be rotatably driven within said casing in the direction of the lead of said outer wire means so that said drive shaft will pump a portion of said grease in said lubricant space toward said output member to a collection station adjacent to the end of said station whereby grease collected therein will cushion contact of said drive shaft with the inner wall of said casing for minimizing noises otherwise resulting from such contact.

2. A drive for vehicle instrumentation comprising a flexible and rotatable drive shaft, said drive shaft having outer wire means helically wound with a predetermined lead, an output member secured to an end portion of said drive shaft to provide a drive connection to said instrumentation, a flexible casing for said drive shaft extending generally coaxially therewith, said cable being spaced radially inwardly from the inner walls of said casing to provide a lubricant receiving space therebetween, a quantity of lubricating grease disposed within said lubricant space adapted, said output member cooperating with said casing and said drive shaft to form a lubricant collection station adjacent to the end of said casing, said drive shaft being adapted to be rotatably driven within said casing in the direction of the lead of said outer wires of said drive shaft so that said drive shaft will pump a portion of said grease toward said output member to said collection station whereby grease collected therein will cushion contact of said flexible drive shaft with the inner wall of said casing for noise abatement.

3. A flexible drive for a deflection instrument and the like comprising in combination a flexible drive shaft having an outer layer of wire wound with a predetermined lead, said shaft being adapted to be driven in a predetermined direction commensurate with the lead of the outer wire of said drive shaft, a rotatable drive tip having an input end drivingly secured to the end portion of said drive shaft, a fixed bearing sleeve rotatably receiving said drive tip, said drive tip having an output end, an outer housing for said bearing sleeve extending axially therefrom to cover the output end of said drive tip, a casing for said drive shaft having a cylindrical inner wall spaced from the outer layer of said drive shaft to provide a lubricating space therebetween, a lubricating grease disposed in said space, a lubricant collection station provided by the input end of said drive tip and the adjacent space between said drive shaft and said casing for collecting said grease, said driving tip having a grease pumping groove therein for pumping grease to said collection station when said drive shaft is driven in a predetermined direction, said grease when collected in said station serving as a cushion to retard contact of said drive shaft with the interior of said casing to abate noises normally produced by contact of said drive shaft with the interior of said casing.

* * * * *